Sept. 25, 1923.
J. W. JENNINGS
DIRIGIBLE HEADLIGHT
Filed May 19, 1921
1,468,637
7 Sheets-Sheet 1
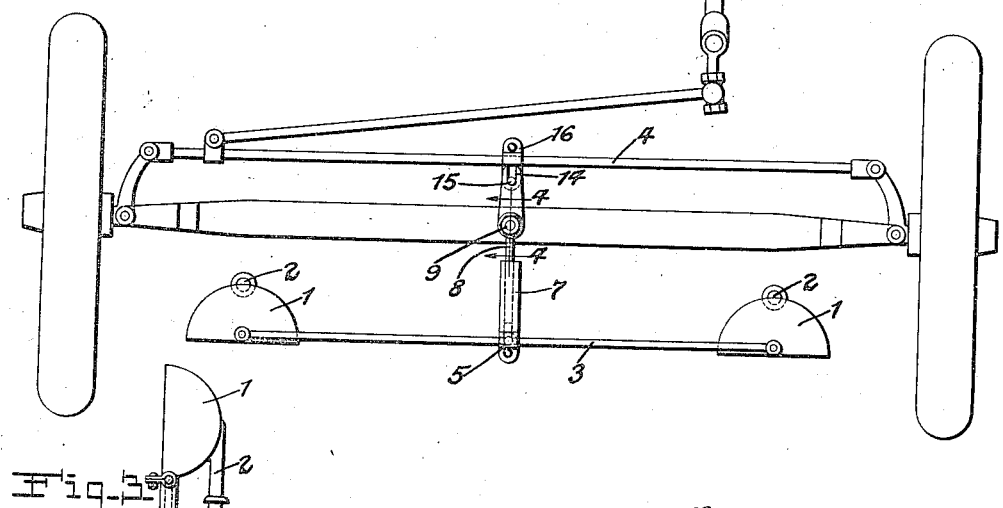
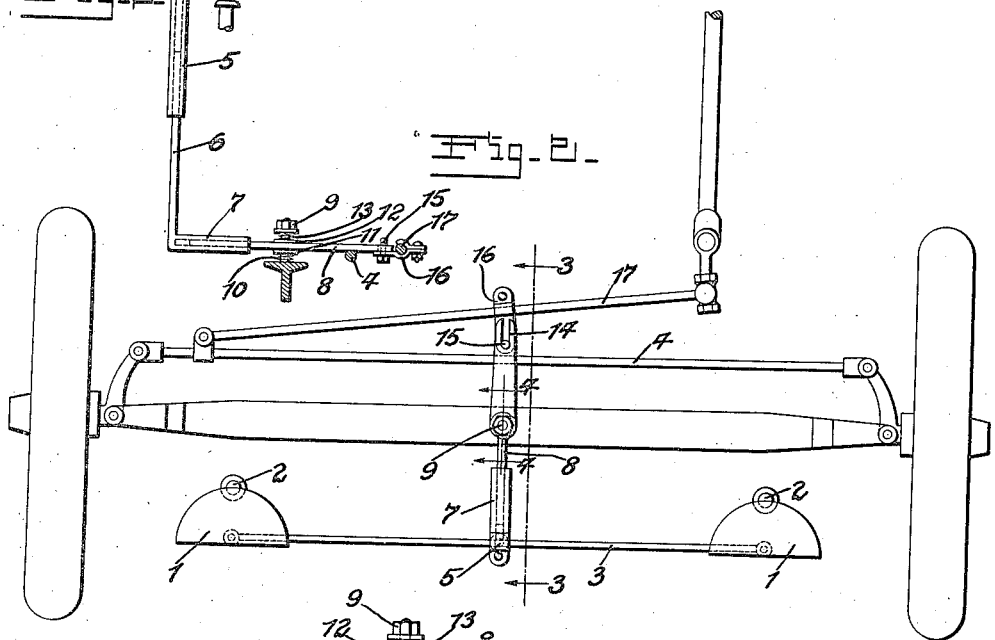
Inventor.
John W. Jennings
by Rippey Kingsland
His Attorneys.

Sept. 25, 1923.
J. W. JENNINGS
DIRIGIBLE HEADLIGHT
Filed May 19, 1921
1,468,637
7 Sheets-Sheet 2
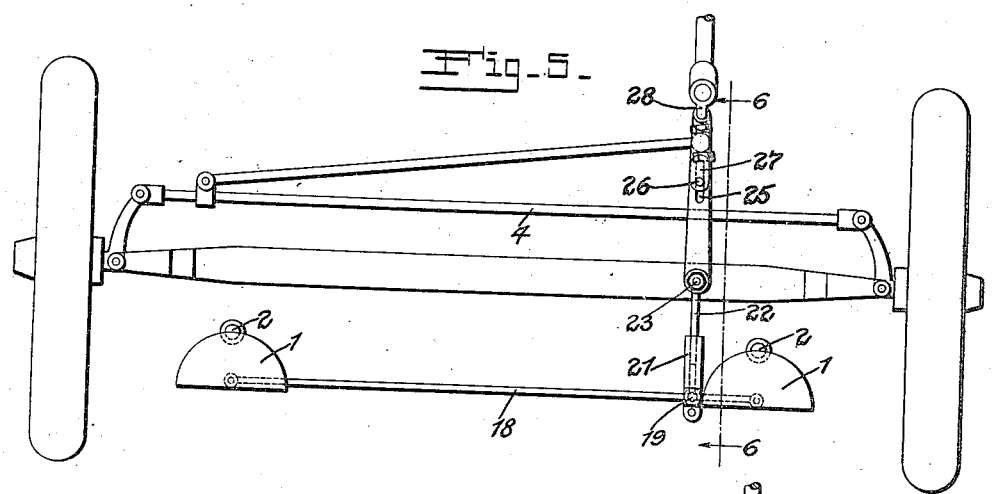
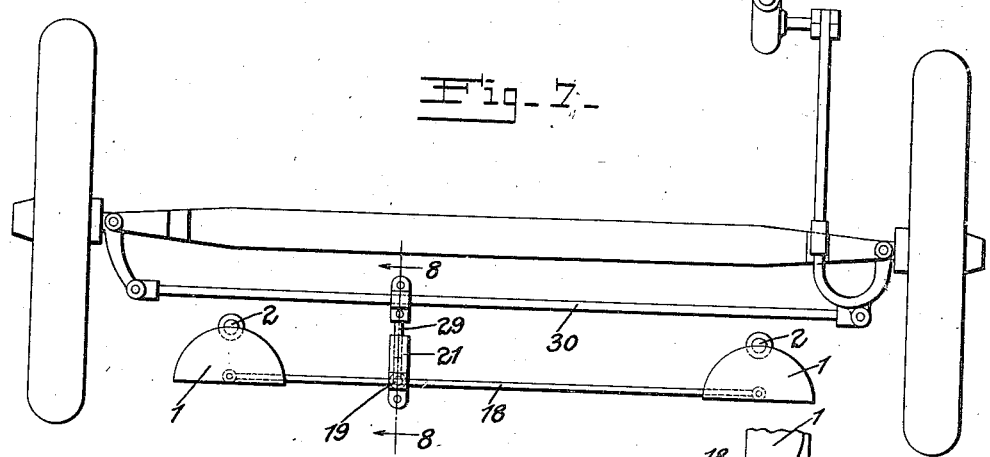
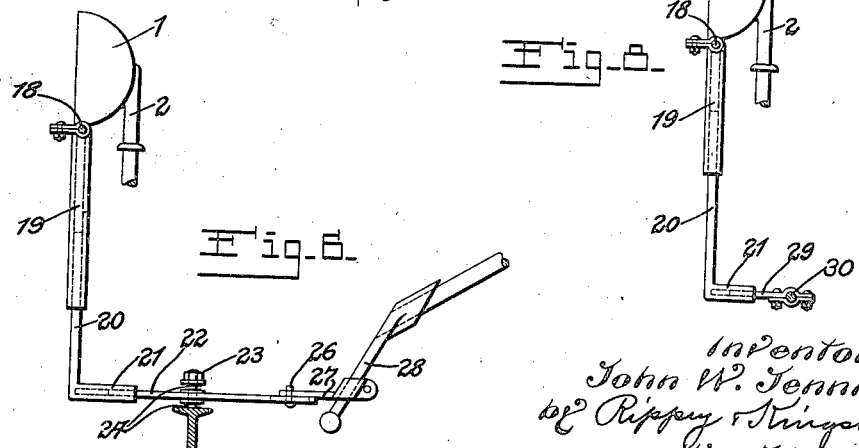
Inventor.
John W. Jennings,
by Rippey & Kingsland,
his Attorneys

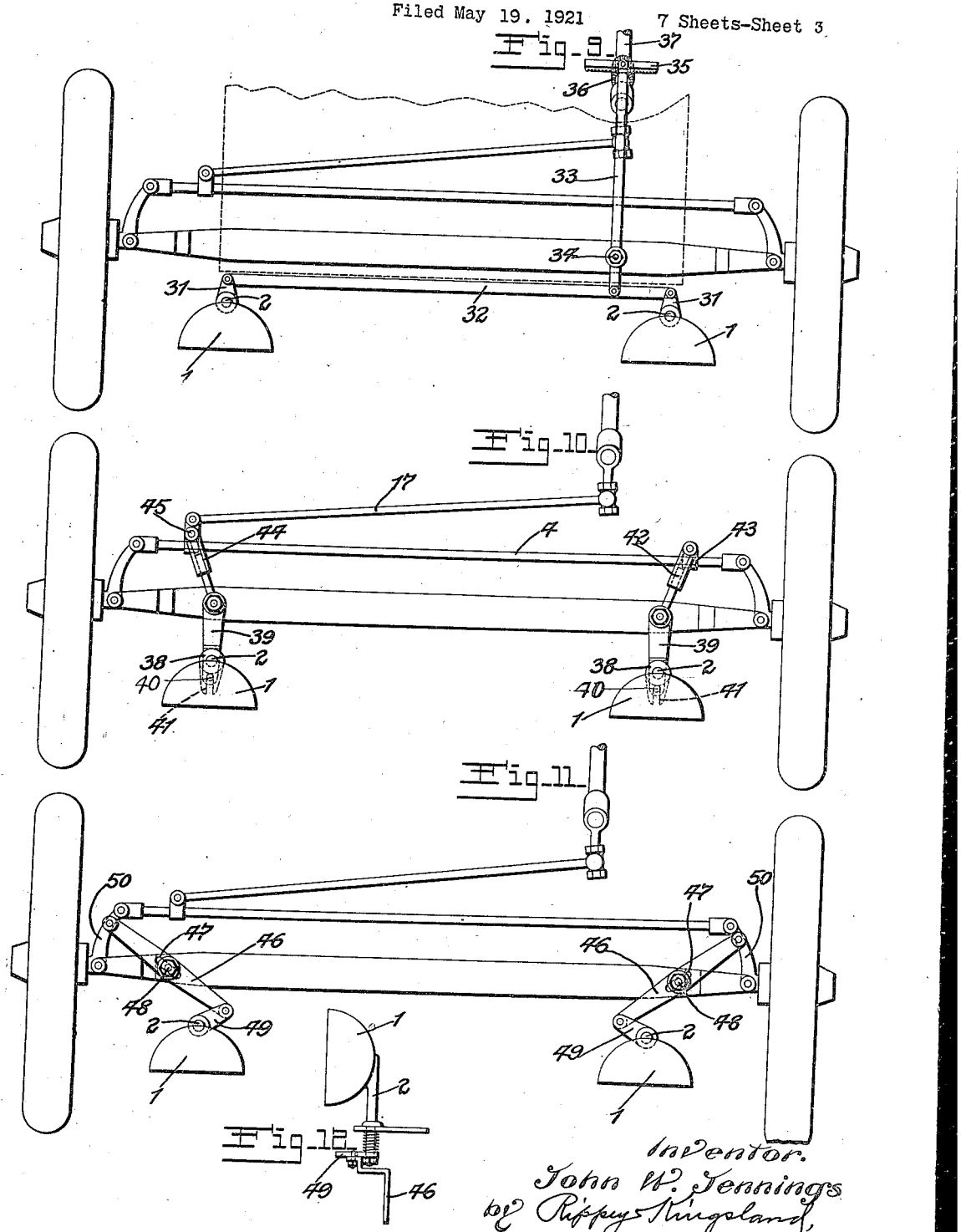

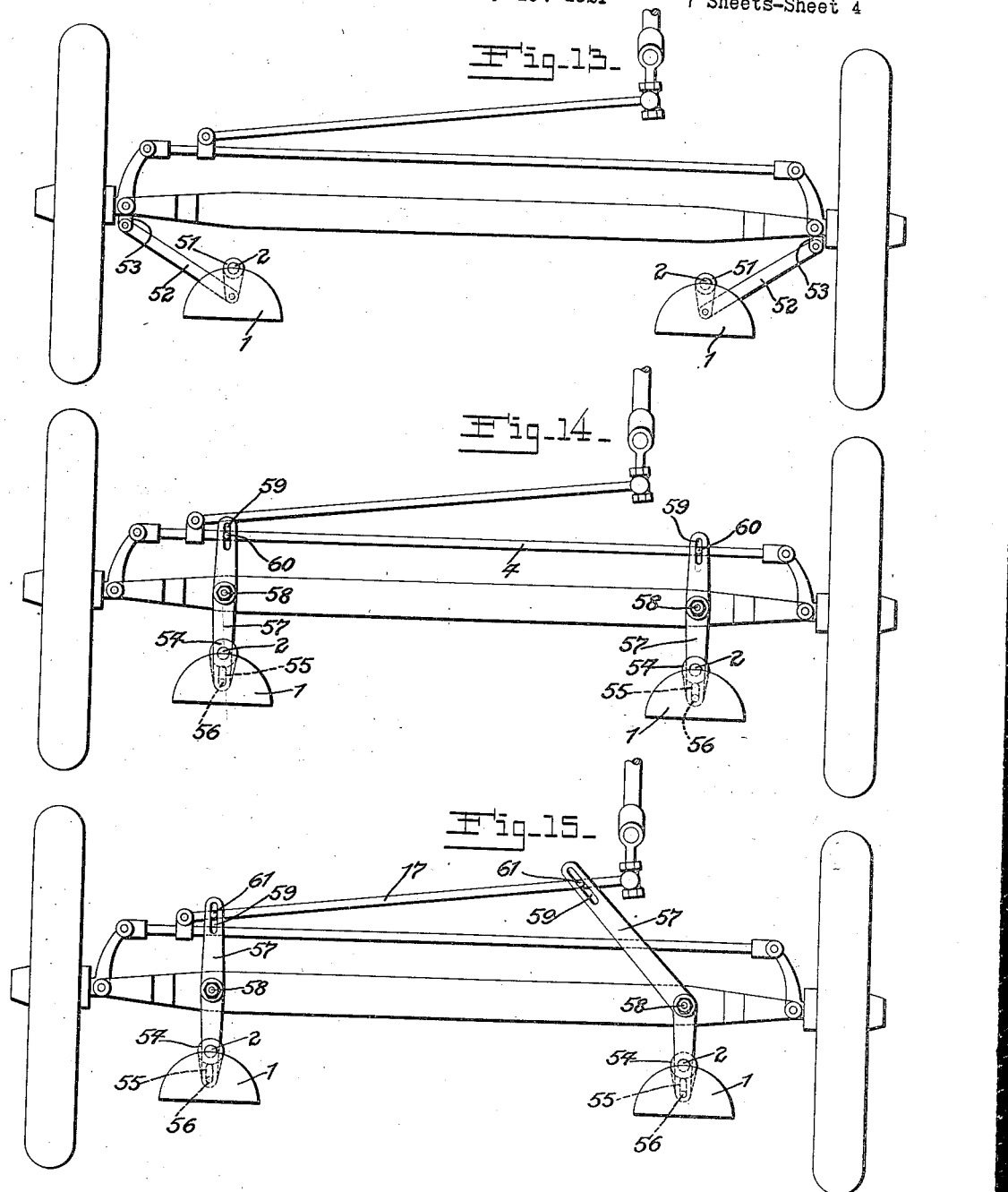

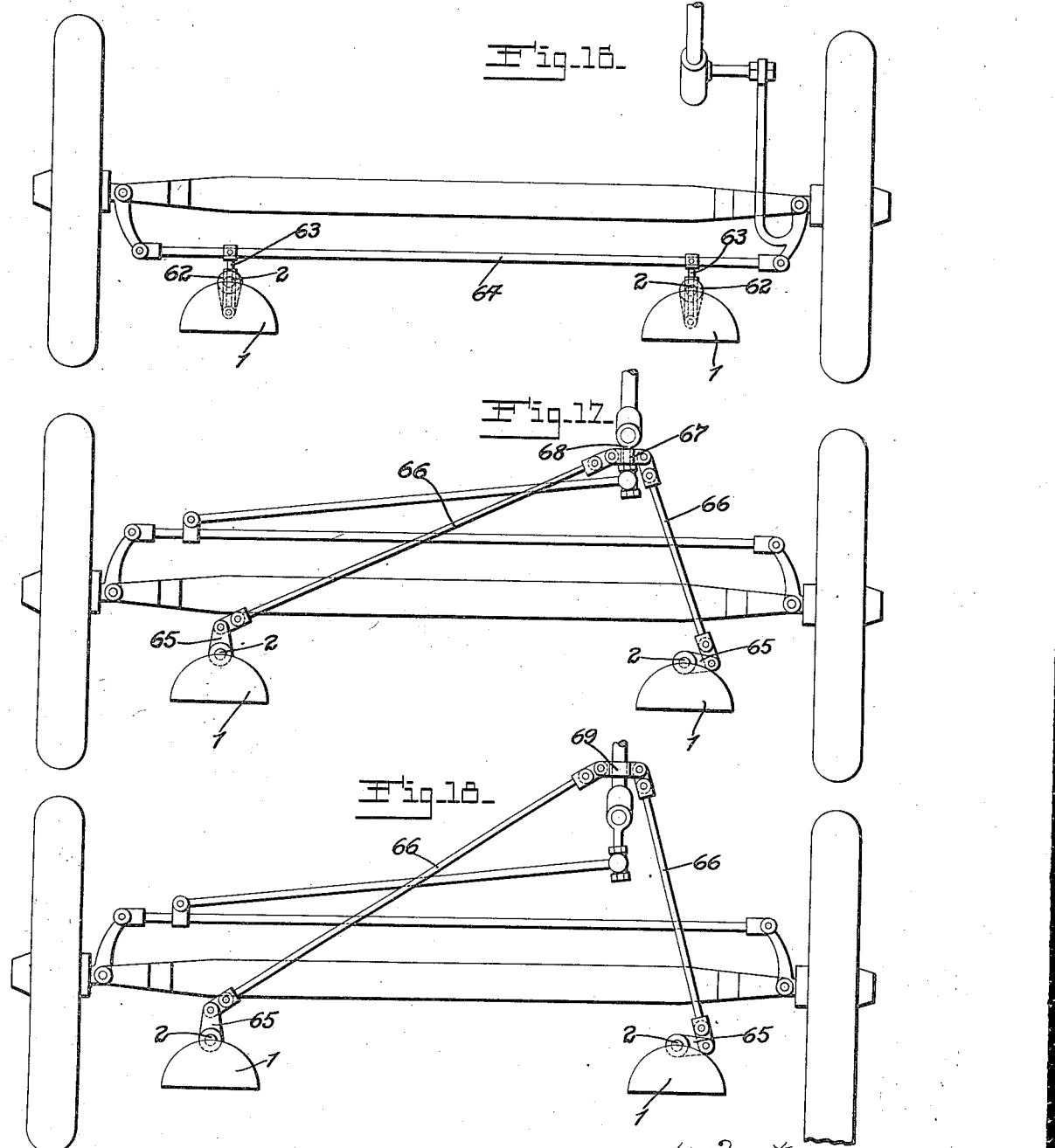

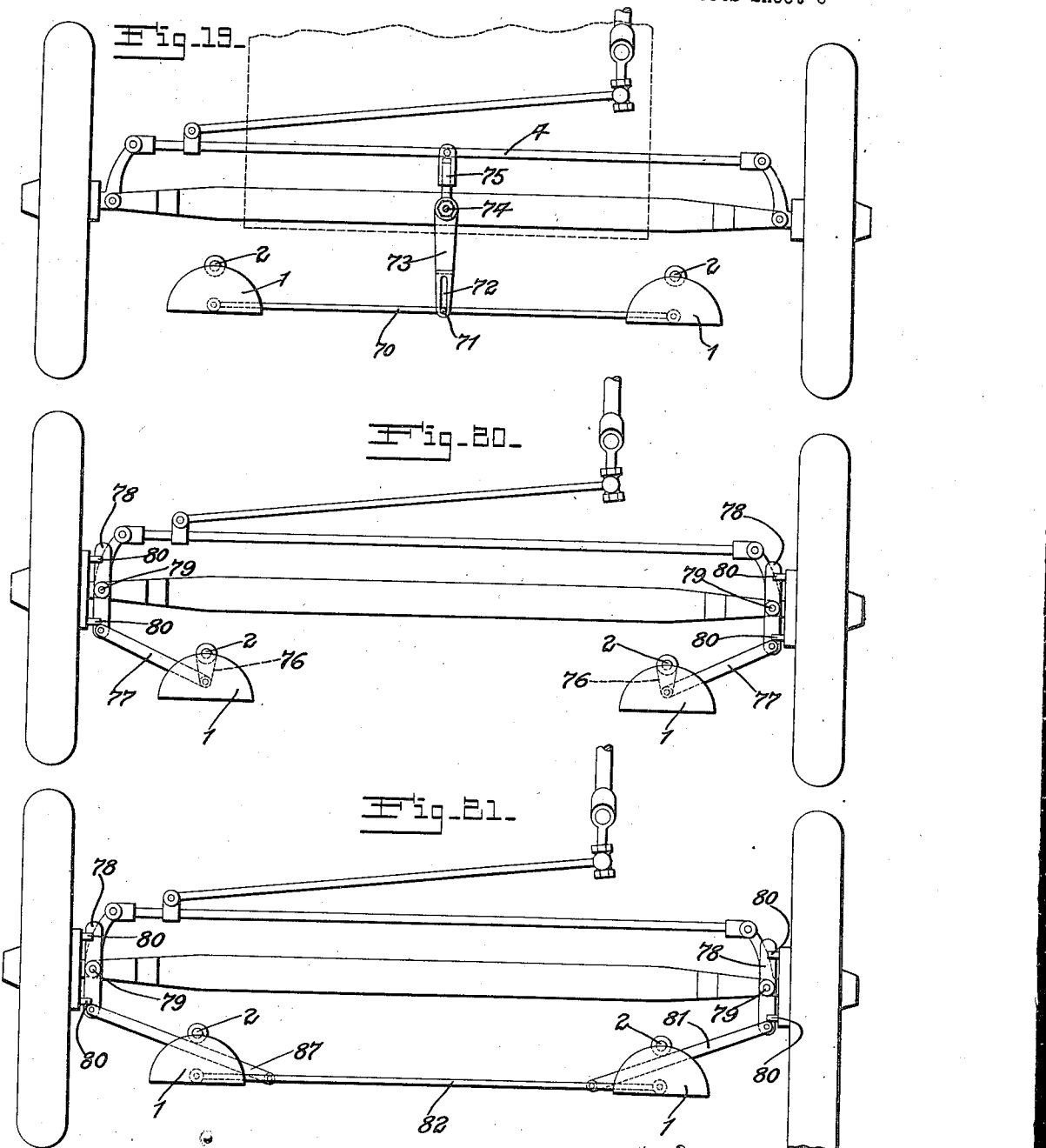

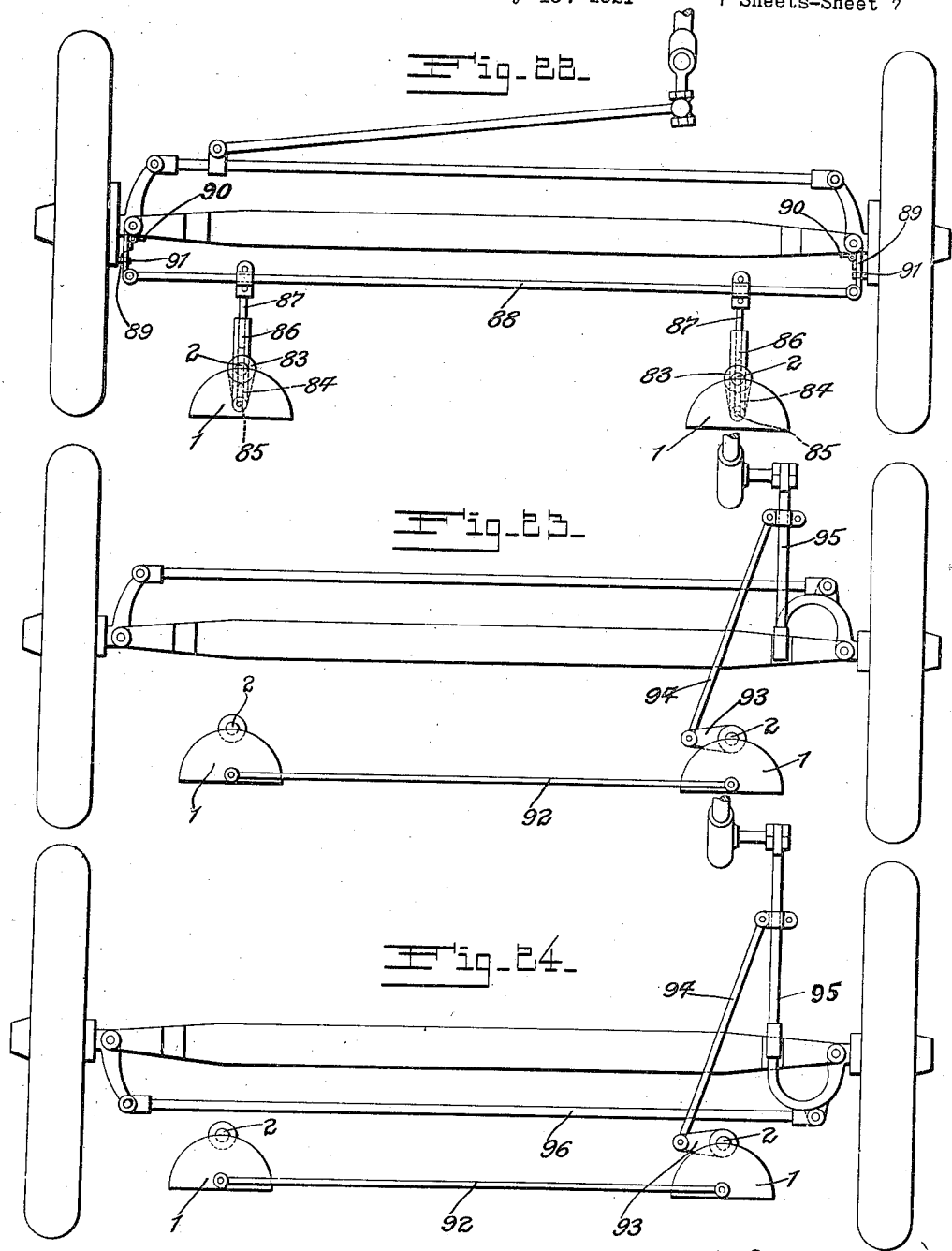

Patented Sept. 25, 1923.

1,468,637

UNITED STATES PATENT OFFICE.

JOHN W. JENNINGS, OF ST. LOUIS, MISSOURI.

DIRIGIBLE HEADLIGHT.

Application filed May 19, 1921. Serial No. 470,878.

*To all whom it may concern:*

Be it known that I, JOHN W. JENNINGS, a citizen of the United States, residing at St. Louis, Missouri, have invented a new and useful Dirigible Headlight, of which the following is a specification.

This invention relates to dirigible head lights.

An object of the invention is to provide connections, operated by part of the steering mechanism of an automobile or similar vehicle, for turning the headlights laterally in either direction during the turning of the automobile from one direction to another. To obtain this result appropriate connections are provided so that the headlights are turned as the steering mechanism is operated to turn the front wheels from one direction to another.

Another object of the invention is to provide means for controlling the direction of the headlights from the front wheels.

In the drawings,

Fig. 1 is a plan view showing the connections for directing the headlights controlled from the connecting rod and supported upon the front axle.

Fig. 2 is a similar view showing connections operated by the drag link connecting an arm of the steering post with the connecting rod.

Fig. 3 is a sectional view on the line 3—3 of Fig. 2, showing the telescoping connection constituting a part of the invention.

Fig. 4 is a sectional view on the line 4—4 of Figs. 1 and 2.

Fig. 5 is a view showing the invention connected up with the arm by which the steering post operates the drag link.

Fig. 6 is a sectional view on the line 6—6 of Fig. 5.

Fig. 7 is a view showing the connections for operating the headlights from the connecting rod in front of the axle.

Fig. 8 is a sectional view on the line 8—8 of Fig. 7.

Fig. 9 is a form of the invention operated directly from the steering post and supported by the body of the automobile.

Fig. 10 shows a form of the invention in which a connection is provided for operating each headlight, and in which the connections lead to the connecting link.

Fig. 11 is a view showing the connections operated by the steering knuckles.

Fig. 12 is a detailed view of a yielding connection included as a part of the invention as shown in Figs. 10 and 11.

Fig. 13 is a view showing the headlight controlling connections operated from in front of the steering knuckles.

Fig. 14 is a view showing an individual connection for each headlight operated by the connecting rod.

Fig. 15 is a view showing an individual connection for each headlight operated by the drag link leading from the connecting rod to the arm of the steering post.

Fig. 16 is a view showing an individual connection for operating the headlight from the connecting link in front of the axle.

Fig. 17 is a view showing a connection for operating each headlight from the arm of the steering column.

Fig. 18 is a view showing another form of connection for operating the headlight directly from the steering column.

Fig. 19 is a view showing a form of the invention operated from the connecting link and supported by the body of the automobile.

Fig. 20 is a view showing an individual connection for each headlight operated directly by the front wheels.

Fig. 21 is a view showing cooperative connections operated directly from the front wheels for operating the headlights.

Fig. 22 is another form of the invention operated directly from the front wheels.

Fig. 23 shows a form of the invention operated from a part of the steering mechanism and in which one of the headlights is operated from the other.

Fig. 24 shows a portion of the form of the invention shown in Fig. 23.

In the form of the invention shown in Fig. 1 the two headlights 1 are supported for lateral turning movements on vertical rods 2. A link 3 connects the headlights so that axial movement of the link in either direction will turn the headlights accordingly. The link 3 is connected with the connecting link 4 of the steering mechanism by a lever device of novel construction and arrangement. As shown, a tubular arm 5 attached to the link 3 extends downwardly and receives the vertical arm 6 of an angular lever. The angular lever includes another arm 7 receiving the forward end of a lever 8 mounted upon a pivot 9 secured to the front axle. A spring 10 bearing upon the front axle supports a washer 11 upon which the lever 8 is mounted. A washer 12 on the lever 8 and a spring 13 above said washer presses the same downwardly against the lever 8. The rear end of the lever 8 has a slot 14 receiving a pin 15 on a bracket 16 attached to the connecting link 4.

The telescoping connection 5—6 in combination with the telescoping connection 7—8 form an expansible and contractible actuating mechanism for turning the headlights in conformity with the change of direction of the front wheels under control of the steering mechanism. The inclusion of the expansible and contractible arrangement enables the parts to adjust themselves to varying conditions without subjecting any of the parts to undue strain. The lever arm 6 is capable of both turning and axial movements within the arm 5, and the arm 7 is capable of turning and axial movements upon the lever 8.

The form of the invention shown in Fig. 2 is the same as that shown in Fig. 1, with the exception that the bracket 16 is secured to the drag link 17 instead of being applied to the connecting link 4 as in Fig. 1. Similar reference numerals are applied to the same parts in Fig. 1 and in Fig. 2.

In the form of the invention shown in Figs. 5 and 6 a connecting rod 18 connects the lower ends of the headlights. A tubular arm 19 extends downwardly from the rod 18. An arm 20 of an angular lever is received within the arm 19 for axial and turning movements therein. An arm 21 extending from the arm 20 receives the forward end of a lever 22 for relative turning and axial movements. The lever 22 is mounted on a pivot 23 supported by the front axle and is held between spring devices 24. The rear end of the lever 22 has a slot 25 receiving a pin 26 in connection with an arm 27 secured to the arm 28 of the steering device. It is apparent that operation of the steering device will turn the headlights in accompaniment with the lateral turning of the front wheels.

In the form of the invention shown in Figs. 7 and 8 the lever arm 21 receives for axial and turning movements the forward end of an arm 29 in rigid connection with the connecting link 30 which is in front of the front axle.

In the form of the invention shown in Fig. 9 a lever 31 extends rearwardly from the lower end of each of the headlight pivot supports 2. A link 32 connects the levers 31. A lever 33 is pivotally mounted on a support 34 carried by the body of the vehicle, and has its forward end pivoted to the link 32 and its rear end connected with a rack 35 meshing with a pinion 36 attached to the steering post 37. It is obvious that turning of the steering post not only changes the direction of the front wheels but also changes the direction of the headlights.

In the invention shown in Fig. 10 a lever 38 is attached to each headlight pivot support 2. Two angular levers 39 are pivoted to the front axle and have vertical arms from which pins 40 extend into slots 41 in the levers 38. The rear end of one of the levers 39 extends into a tubular member 42 pivotally supported by a bracket 43 attached to the connecting link 4. The end of the other arm 39 extends into a tubular member 44 mounted on a pivoted support 45 carried by the connection between the connecting link 4 and the drag link 17. It is obvious that as a result of operation of the steering mechanism to change the direction of movement of the vehicle the direction of the headlights will also be changed.

In the invention shown in Figs. 11 and 12 a pair of levers 46 are pivotally supported by the front axle. Each of the levers 46 has a longitudinal slot 47 receiving the pivots 48 and permitting longitudinal movement of said levers 46. The forward end of the levers 46 are pivotally connected with levers 49 attached to the headlight pivot supports 2, and the rear ends or said levers 46 are pivoted to the steering knuckles 50. By these connections the direction of the headlights is changed in accompaniment with the direction of the front wheels.

In the invention shown in Fig. 13 each of the headlight pivot supports is provided with a lever 51. The levers 51 extend forwardly. The forward end of links 52 are pivoted to the levers 51 and the rear ends of said links are pivoted to projections 53 on the vertical portions of the steering knuckles. Thus the headlights are operated in conformity with the direction of the front wheels.

In the invention shown in Fig. 14 the headlight pivot supports 2 have levers 54 on their lower ends extending forwardly. The levers 54 have slots 55 receiving pins 56 on the forward ends of levers 57. The levers 57 are mounted on pivots 58 secured to the front axle. The rear ends of the levers 57 have slots 59 receiving pins 60 in rigid connection with the connecting link 4.

In the invention shown in Fig. 15 the arrangement is the same as that shown in Fig. 14, except that the slots 59 in the levers 57 receive pins 61 rigid with the drag link 17.

In the invention shown in Fig. 16 each of the headlight pivots 2 is equipped with a lever 62. Each of the levers 62 is connected by a telescopic device 63 with the connecting link 64 in front of the front axle.

In the invention shown in Fig. 17 each of the headlight pivots 2 has a lever 65 on its lower end. A link 66 extends from each of the levers 65 to a pivotal connection with the bracket 67 attached to the arm 68 in connection with the steering post.

The invention shown in Fig. 18 is the same as that shown in Fig. 17, with the exception that the rear ends of the links 66 are connected with a bracket 69 attached directly to the steering post.

In the invention shown in Fig. 19 the headlights are connected by a link 70 having a projection 71 thereon extending into a slot 72 in a lever 73. The lever 73 is pivoted on a support 74 carried by the automobile body instead of the axle. The rear end of the lever 73 extends into a tubular part 75 pivotally connected with the connecting link 4.

In the invention shown in Fig. 20 each headlight pivot support 2 is provided with a forwardly extending lever 76. A link 77 is pivoted to each lever 76 and the outer ends of the links 77 are pivoted to the forward ends of the actuators 78. The actuators 78 are mounted on pivots 79 and have rollers 80 operating against adjacent portions of the front wheels, so that any lateral turning movement of the front wheels turns the headlights in accompaniment therewith.

The invention shown in Fig. 21 is the same as that shown in Fig. 20, with the exception that the actuators 78 have connecting links 81 whose inner ends are pivoted to the link 82 connecting the headlights.

In the invention shown in Fig. 22 each headlight pivot 2 has a forwardly extending lever 83 provided with a slot 84. The slots 84 receive pins 85 on the ends of levers 86. The opposite ends of the levers 86 have telescopic connection with arms 87 extending from the connecting link 88. The connecting link 88 is supported by arms 89 mounted on hinges 90 and having rollers 91 operating against adjacent portions of the front wheels. Thus the direction of the headlights is determined directly by the wheels.

In the invention shown in Fig. 23 the headlights are connected by a link 92. One of the headlight pivots has an arm 93 from which a link 94 extends to the connection 95 by which the steering post controls the direction of the vehicle.

The invention shown in Fig. 24 is the same as that shown in Fig. 23, with the exception that the connecting link 96 of the steering mechanism is in front of the front axle.

From the foregoing it will be seen that my invention obtains all of its intended objects. The invention may be easily mounted on any automobile and will effectively control the headlights to throw the light in the direction to which the automobile is turned.

I do not restrict myself to unessential details, but what I claim and desire to secure by Letters Patent, is:—

1. In an automobile having a front axle, the combination of headlights, vertical supports on which the headlights are mounted for lateral turning movements, a link connecting the headlights, an arm attached to said link, a lever extending forwardly and rearwardly across the front axle and having pivotal connection therewith, an angular element having telescoping connection with said arm and with said lever, and means for operating said lever from the steering mechanism of the automobile.

2. In an automobile, the combination of headlights supported for lateral turning movements, a link connecting the headlights, steering mechanism for the automobile including a drag link, an arm supported by the link that connects the headlights, a lever connected with said arm for axial and turning movements relative thereto, an additional lever connected to the first-named lever for axial and turning movements relative thereto, a spring device supporting the second lever, a pivot on which the second lever is mounted, an element attached to the drag link of the steering mechanism, and a pin and slot connection between said element and said second lever for operating said second lever when the drag link is moved.

3. In an automobile having a front axle, the combination of pivoted headlights, a link connecting the headlights, a downwardly extending arm attached to and supported by said link, a forwardly and rearwardly extending lever extending across the front axle, a pivot on the front axle for said lever, a device having telescoping connection with said lever and also with said arm for relative axial and turing movements, and a device operated by the steering mechanism of the automobile for operating said lever.

4. In an automobile, the combination of pivoted headlights, a link connecting the headlights, a downwardly extending arm attached to said link, a lever connected with a part of the steering mechanism and extending forwardly therefrom across the front axle, a pivot supported by the front axle for said lever, and an angular member having a rearwardly extending arm in telescoping connection with said lever and an upwardly extending arm in telescoping connection with the arm attached to said link.

5. In an automobile, the combination of pivoted headlights, a link connecting the headlights, a downwardly extending arm attached to said link, a lever connected with a part of the steering mechanism and extending forwardly therefrom, a pivot for said lever between the forward and rear ends thereof, an angular member having a rearwardly extending arm in telescoping connection with said lever, and an upwardly extending arm in telescoping connection with said depending arm for relative axial and turning movements.

6. In an automobile, the combination of pivoted headlights, a link connecting the headlights, a downwardly extending arm attached to said link, a lever connected with a part of the steering mechanism and extending forwardly therefrom, a pivot for said lever between the forward and rear ends thereof, an angular member having a rearwardly extending arm in telescoping connection with said lever, an upwardly extending arm in telescoping connection with said depending arm for relative and turning movements, and an elastic support for said lever.

JOHN W. JENNINGS.